United States Patent [19]

Clarke

[11] 4,340,285
[45] Jul. 20, 1982

[54] RECEPTACLE ATTACHMENT FOR CAMERAS

[76] Inventor: George A. Clarke, 4413 Valerie, Houston, Tex. 77401

[21] Appl. No.: 169,872

[22] Filed: Jul. 17, 1980

[51] Int. Cl.³ .................... G03B 3/00; G03B 17/52
[52] U.S. Cl. .................................... 354/75; 354/86
[58] Field of Search .............. 354/83, 86, 80, 295, 354/354, 75; 355/3 SH, 39; 36/58.6; 232/44, 45

[56] References Cited

U.S. PATENT DOCUMENTS

| | | | |
|---|---|---|---|
| 2,241,300 | 5/1941 | Gale | 355/39 X |
| 2,496,630 | 2/1950 | Land | 354/86 |
| 2,873,658 | 2/1959 | Land | 354/86 |
| 3,249,029 | 5/1966 | Wareham | 354/75 |
| 3,336,683 | 8/1967 | Schellkopf | 36/58.6 X |
| 3,364,594 | 1/1968 | Gruver | 271/303 X |
| 3,457,846 | 7/1969 | Little | 354/83 X |
| 3,511,496 | 5/1970 | Zoglmann | 271/37 |
| 3,622,239 | 11/1971 | Miller | 355/39 |
| 3,650,188 | 3/1972 | Whall | 354/187 |
| 3,815,990 | 6/1974 | Newcomb et al. | 355/3 SH X |
| 3,836,925 | 9/1974 | Steponaitis | 354/75 |
| 4,155,643 | 5/1979 | Ladds et al. | 355/72 |

Primary Examiner—Donald A. Griffin
Attorney, Agent, or Firm—Gunn, Lee & Jackson

[57] ABSTRACT

A photograph receiving receptacle attachment for motorized cameras is defined by a framework structure defining a receptacle of sufficient dimension to receive a plurality of self-developing photograph units in stacked manner therein. Positioning means is provided on the framework structure and is adapted to engage predetermined portions of the camera to thus orient framework structure with respect to the camera. Retainer means is interconnected with the framework structure and is adapted to establish retaining engagement with the camera to thus removably secure the framework in assembly with the camera structure.

7 Claims, 8 Drawing Figures

U.S. Patent   Jul. 20, 1982   Sheet 1 of 2   4,340,285
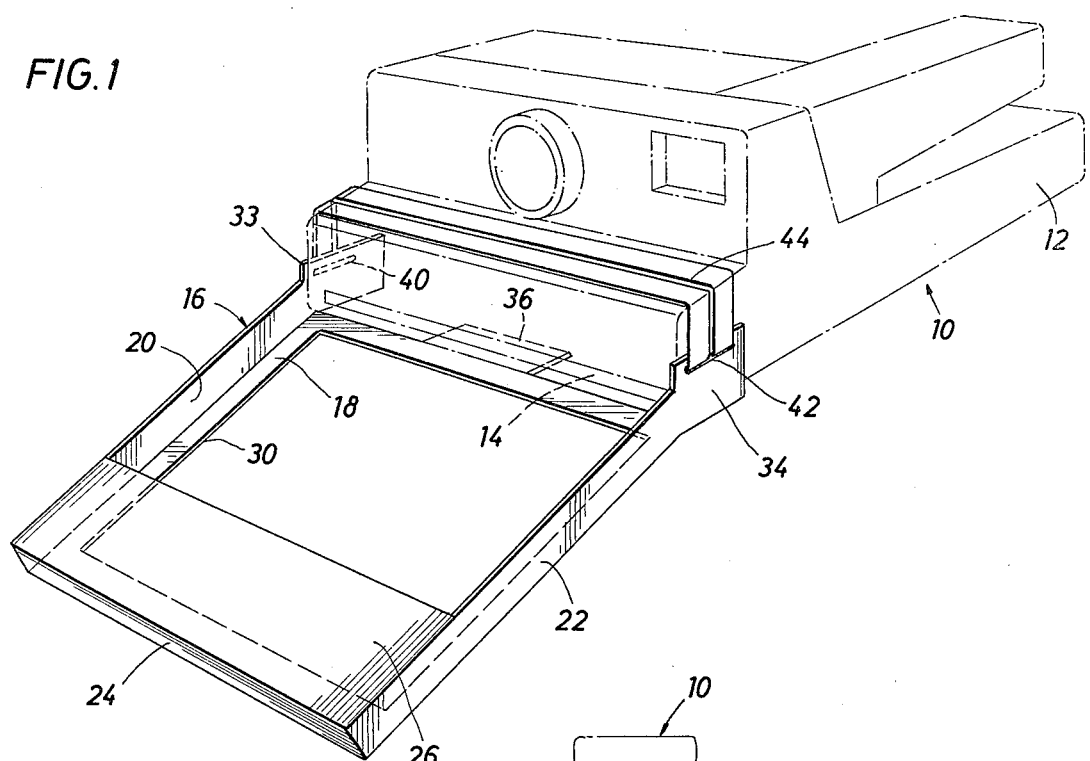
FIG.1
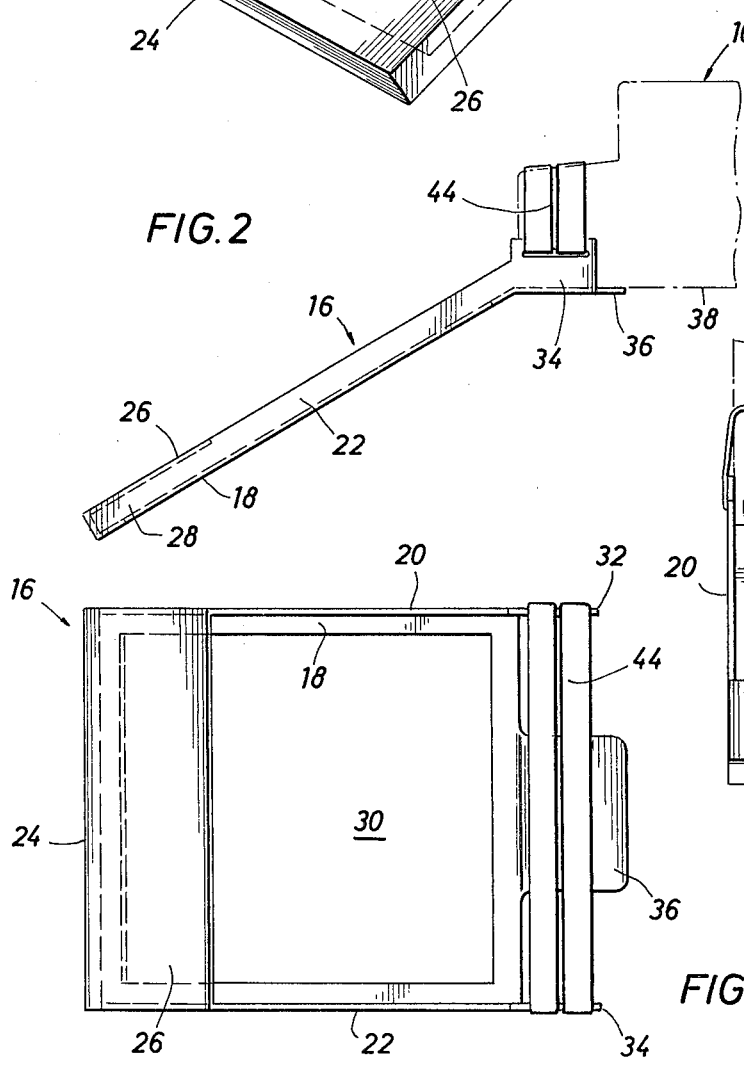
FIG.2
FIG.3
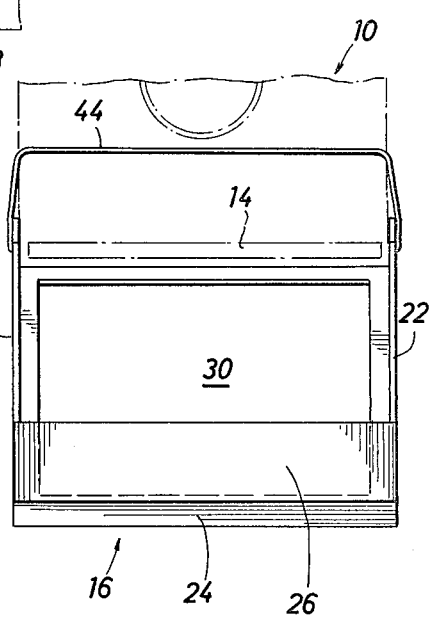
FIG.4

# RECEPTACLE ATTACHMENT FOR CAMERAS

FIELD OF THE INVENTION

This invention relates generally to cameras of the motorized type utilizing self-developing type film units and which transports individual exposed film units to an externally presented position with respect to the camera structure, thereby enabling the user of the camera to grasp the exposed film unit and remove it from the camera. More specifically, the present invention is directed to a photograph receiving receptacle attachment that is adapted to be removably interconnected with the camera structure and is functional to provide an automatic film receiving facility for temporary storage of exposed film units, thus allowing the user of the camera to take a number of consecutive photographs without necessitating individual handling of the photographs in order to remove them from the camera.

FIELD OF THE INVENTION

Motorized cameras have become quite popular because they provide the user with the capability of taking self-developing type photographs. In the case of certain ones of such motorized cameras, especially of less expensive nature, camera structure is provided to receive a film pack and to provide for sequential exposure of film units contained within the film pack. After each film unit is exposed, it is transported by the motorized drive mechanism of the camera such that the exposed film unit is fed through a delivery slot in the camera structure and is moved to a presented position where most of the film unit is presented to be grasped by the user and removed from the camera. Under circumstances where the user attempts to take another photograph without having first removed the exposed and presented film unit from the camera, the presented film unit will be released and ejected by the motorized drive mechanism of the camera upon movement of the next exposed film to the presented position. In this case, the previously exposed film will fall from the camera whereupon it may be contaminated by dirt or water present in the environment or it may become scratched or otherwise damaged as it falls from the camera. It is desirable, therefore, to provide means for retaining film units that are ejected from the camera during the taking of subsequent photographs, and thereby provide the user with a capability to take rapid successive photographs without necessitating individual handling of the film units after each exposure. To thus provide for collection and retention of photographs in this manner, provides the camera mechanism with a capability that is beyond the scope of its original design, as well as providing the user with an effectively enhanced camera and film handling system.

DESCRIPTION OF THE PRIOR ART

U.S. Pat. Nos. 2,467,320 and 2,873,658 are directed generally to enclosure structures for receiving and storing film units subsequent to exposure. U.S. Pat. No. 3,650,188 is directed to apparatus wherein a plurality of film units are adapted to be sequentially exposed and processed and wherein apparatus is provided for moving the exposed film units out of the camera and into an enclosure which is adapted to be detachably connected to the camera structure. Of general interest to the present subject matter is a receiver tray mechanism for photocopy machines such as shown by U.S. Pat. No. 4,155,643. Other patents of general interest are U.S. Pat. Nos. 3,364,594 and 3,511,496.

SUMMARY OF THE INVENTION

It is a primary feature of this invention to provide a novel photograph receiving receptacle attachment for motorized cameras which may be simply and efficiently attached to or removed from the camera structure without requiring tools of any sort. It is also an important feature of this invention to provide a novel photograph receiving receptacle attachment which is provided to receive photographs that are dispensed from motorized cameras utilizing self-developing type film units wherein sequential operation of the camera mechanism causes previously exposed film units to descend into a protective receptacle.

It is also a feature of this invention to provide a novel photographic receiving receptacle attachment for cameras, wherein individual or multiple previously exposed film units may be readily removed from or replaced in the receptacle as desired by the user.

Another feature of this invention includes the provision of a novel photograph receiving receptacle attachment for cameras which is formed to define a viewing opening, allowing a photograph to be inspected such as for visual detection of proper exposure, etc., while the film unit remains within the protective receptacle.

It is an even further feature of this invention to provide the user with the capability of taking sequential photographs in rapid fashion without necessitating individual handling of the film units after making each exposure.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the scope of the present invention.

Briefly, the invention is accomplished by means of a generally rectangular framework that defines a protective receptacle of sufficient dimension to receive a plurality of self-developing photograph units in stacked manner therein. The framework structure is capable of being positioned in assembly with the camera in such manner that the outlet or dispensing opening of the camera is in registry with the protective enclosure defined by the framework structure. At one extremity of the framework structure is provided a pair of spaced side positioning elements that are capable of engaging opposed side portions of a camera so as to at least partially orient the framework structure with respect to the camera. The bottom portion of the framework structure is formed to define a bottom positioning element that is adapted to engage a bottom surface portion of the camera structure and which cooperates with the side positioning elements to establish proper orientation of the framework relative to the camera. A retainer element such as an elastic band is interconnected with the framework structure and is adapted to engage or partially encircle a structural portion of the camera and provide sufficient retaining force to releasably secure the framework structure in assembly with the camera.

BRIEF DESCRIPTION OF THE DRAWINGS

In order that the manner in which the above-recited advantages and features of the invention are attained and can be understood in detail, more particular description of the invention, briefly summarized above, may be had by reference to the specific embodiment thereof that is illustrated in the appended drawings, which drawings form a part of this specification. It is to be understood, however, that the appended drawings illustrate only a typical embodiment of this invention and therefore are not to be considered limiting of its scope, for the invention may admit to other equally effective embodiments.

In the Drawings:

FIG. 1 is an isometric illustration showing a conventional camera in broken lines and illustrating a photograph receiving receptacle attachment in full lines, such attachment being positioned in photograph receiving assembly with the camera structure.

FIG. 2 is a side view of the camera and photograph receiving receptacle of FIG. 1, illustrating further structural details of the receptacle attachment and showing angular positioning of the receptacle attachment with respect to the camera structure.

FIG. 3 is a plan view of the photograph receiving receptacle attachment of FIGS. 1 and 2.

FIG. 4 is a front view of the camera and photograph receiving receptacle attachment of FIGS. 1 and 2.

DETAILED DESCRIPTION OF PREFERRED EMBODIMENT

Figure 5:
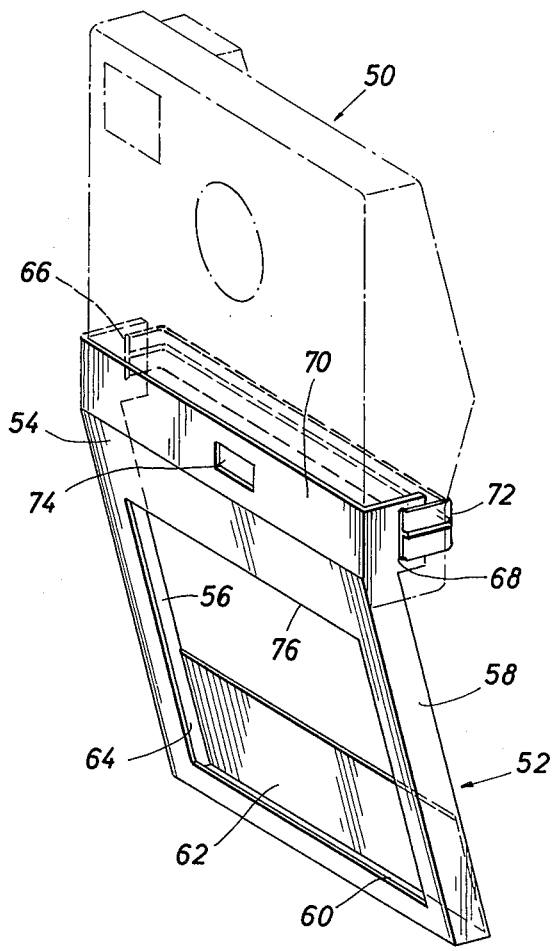
FIG. 5 is an isometric view of a camera shown in broken lines and a photograph receiving receptacle attachment shown in full lines, such receptacle attachment representing an alternative embodiment of the present invention.
Figure 6:
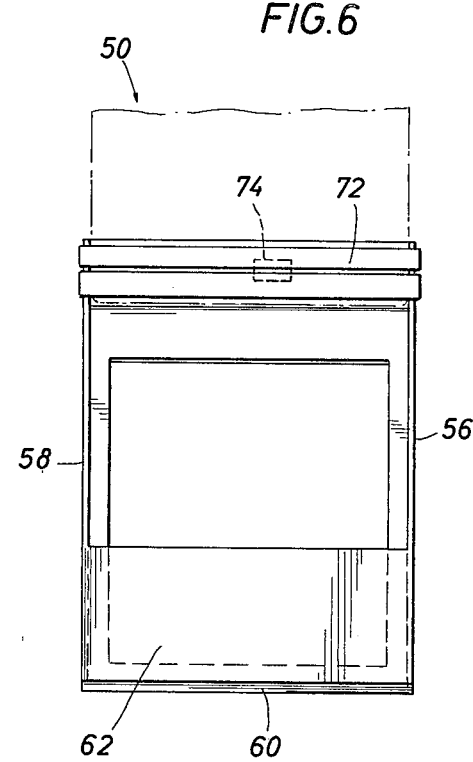
FIG. 6 is a partial elevational view illustrating further structural details of the photograph receiving receptacle attachment and showing a portion of the camera structure of FIG. 5 in broken line.
Figure 8:
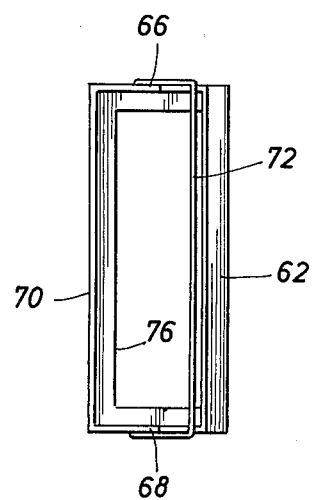
FIG. 8 is a plan view of the photograph receiving receptacle attachment of FIGS. 5, 6 and 7.
Figure 7:
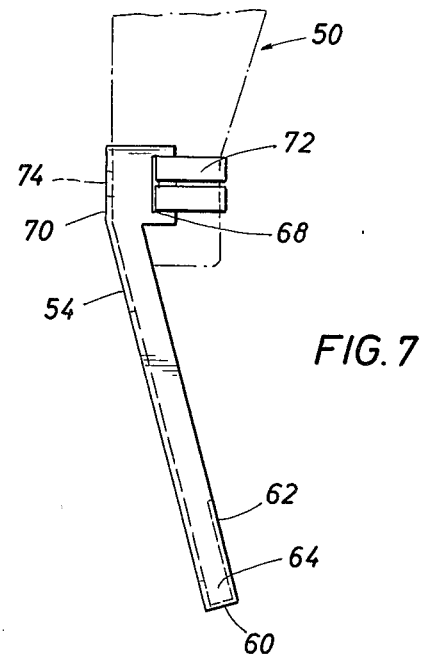
FIG. 7 is a side elevational view of the camera and photograph receiving receptacle attachment of FIGS. 5 and 6, illustrating a portion of the camera structure in broken lines.

Referring now to the drawings and first to FIG. 1, a camera mechanism is illustrating generally at 10, which camera mechanism is of the motorized type utilizing self-developing type photographic film units and having the capability of dispensing individual film units subsequent to exposure thereof. The camera structure incorporates a protective chamber 12 within which a film pack is positioned, the film pack incorporating a plurality of unexposed film units that are positioned in stacked relation. The camera structure defines a dispensing opening 14 through which individual film units are driven by the motorized drive mechanism of the camera subsequent to exposure thereof. As each film unit is exposed, the motorized drive mechanism of the camera transports a portion of the exposed film unit through the dispensing opening 14, thus presenting the film unit to be manually grasped and removed from the camera. The exposed film unit is presented in such manner that a small portion of the film unit is retained within the dispensing opening and is supported by the drive mechanism of the camera. If the camera 10 is again operated with a previously exposed film unit being positioned within the dispensing opening, the drive mechanism will cause the exposed film unit to be ejected, whereupon it will fall from the camera. The ejected film unit is therefore capable of being lost or damaged by water, dirt or other debris and is also likely to be scratched or otherwise damaged as it falls from the camera. It is desirable, therefore, to provide means for receiving a photograph that is ejected from the camera and retaining the ejected photograph in protected manner and thus also providing the user of the camera with the capability of taking sequential photographs without necessitating handling of the exposed film units after each exposure. In accordance with the present invention, a photograph receiving receptacle attachment for motorized cameras may conveniently take the form illustrated in FIGS. 1-4. The photograph receiving receptacle attachment is defined by a generally rectangular framework structure illustrated generally at 16 which is defined by a bottom wall 18 having a pair of side walls 20 and 22 extending upwardly therefrom. A lower end wall 24 also extends upwardly from the bottom wall 18 and a partial top wall 26 is positioned in engaging relation with the bottom wall 24 and the opposed side walls 20 and 22. The partial top wall 26 is positioned so that a large upwardly directed access opening is formed by the cooperative relationship of the side wall members and the top wall. After photographs are dispensed into the photograph receiving receptacle, the lower portions of the photographs will descend into a protective chamber 28 defined by the bottom wall, side walls and the partial top wall. The upper portion of the photographs will be positioned in such manner relative to the access opening that the user may readily move one or more of the photographs upwardly to extract it from the protective enclosure and receptacle attachment structure, if desired. Also, if desired, a removed photographic unit may be replaced into the protective receptacle for safekeeping by inserting it through the access opening into the protective receptacle.

The bottom wall 18 of the receptacle attachment structure is formed to define a generally rectangular viewing opening 30 through which most if not all of the exposed portion of the photographic film unit may be inspected by the user if desired, such as to determine if the light exposure is proper or should need adjustment to accommodate light conditions, film speed, etc.

It is desirable to retain the photograph receiving receptacle attachment in assembly with the structure of camera 10 and this is effectively accomplished in accordance with the present invention by providing the receptacle attachment with orienting means. The orienting means may conveniently take the form of a pair of side positioning elements that cooperate with a bottom positioning element to establish controlled positioning engagement with respect to the structure of the camera. Side positioning elements, such as shown at 32 and 34, are formed integrally with the side wall members 20 and 22 and are slightly angulated with respect to the side wall members as shown best in FIG. 2. The side positioning elements 32 and 34 are adapted to be positioned in engagement with respective side surfaces of the camera 10 and to restrict lateral movement with respect to the camera structure. A bottom positioning element 36 extends from the bottom wall structure 18 and may be in the form of a tab that is received within a recess formed in the bottom wall of the camera 10. The bottom wall or tab 36 cooperates with the side positioning elements 32 and 34 to define multisurface positioning, thereby establishing proper orientation of the photograph receiving receptacle attachment with respect to the camera structure upon positioning of these respective positioning elements relative to the camera structure. The bottom positioning element or tab 36 is angulated with respect to the bottom wall 18 and, when positioned in properly oriented relation with the bottom wall 38 of the camera, establishes proper angular orientation of the bottom and side walls of the receptacle attachment, such as shown in FIG. 2.

In order to retain the receptacle attachment structure in assembly with the camera 10, the side positioning elements 32 and 34 are formed to define retainer openings 40 and 42, respectively. An elastic retainer element 44 is provided, having the extremities thereof secured within respective apertures 40 and 42 defined in the side positioning elements 32 and 34. The elastic retainer element 44 may be composed of any suitable elastic material and is adapted to be positioned in partially encircling relationship with a portion of the structure of camera 10. The retainer element 44 is adapted to provide sufficient retaining force through its elastic quality that the side positioning elements 32 and 34 and the bottom positioning element or tab 36 will be maintained in positioning engagement with respect to the camera structure.

To assemble the photograph receiving receptacle attachment to the camera 10, the side positioning elements and the bottom positioning tab are brought into positioning engagement with the outer wall surface structure of the camera. After this has been done, the elastic retainer element 44 is pulled upwardly and stretched over a structural portion of the camera, such as shown particularly in FIGS. 1 and 2, whereupon sufficient retention force is developed to maintain the receptacle attachment in assembly with the camera structure. As photographs are taken, they pass through the dispensing opening 14 of the camera and are transported to a presenting positioning. If the camera mechanism is then again actuated, the previously exposed film unit falls from the dispensing opening 14 and descends until the bottom portion of the film unit enters the protective chamber 28 and engages the bottom wall 24. In this condition, the film unit is retained and protected. Should additional photographic units be dispensed in similar manner, they will simply descend into protected and received relation within the chamber 28 of the receptacle attachment and will be stacked therein. The user may remove one or more of the exposed film units through the upwardly directed opening or simply inspect the lowermost one of the film units by looking through the bottom inspection opening 30.

As shown in FIGS. 5–8, photograph receiving receptacle attachments may be provided for motorized cameras of various configuration. As shown in FIG. 5, a camera is shown in broken line at 50 and a photograph receiving receptacle attachment is shown in full line at 52. The camera 50 defines a downwardly directed dispensing opening, not shown. The photograph receiving receptacle attachment 52 is positioned such that exposed photograph film units descending from the dispensing opening will fall into protected relation within the receptacle attachment if released by the camera mechanism. The receptacle attachment 52 is formed by a bottom wall structure 54 having side wall members 56 and 58 extending therefrom. A lower end wall 60 also extends from the bottom wall 54 and is engaged by a partial protective wall 62 that also engages the side walls 56 and 58. The partial wall 62 cooperates with the side wall elements 56 and 58 to define an access opening allowing the user of the camera mechanism to remove exposed film units from the receptacle attachment or replace them as desired. The partial wall 62 also cooperates with the side walls and bottom wall to define a protective receptacle 64 within which the lower portion of each of the photographic film units will be received in protected relation upon being ejected from the camera mechanism. Side positioning elements 66 and 68 are formed integrally with the side wall members 56 and 58 and are adapted, respectively, to engage opposed side portions of the camera structure 50 and thus retain the receptacle attachment in properly positioned relation with respect to the camera structure. A transverse positioning wall 70 extends from the bottom wall 54 and also extends from the side positioning elements 66 and 68. The positioning wall 70 is disposed in angulated relation with respect to the bottom wall 54, thus providing an orienting means for orienting the bottom wall and thus the receptacle attachment structure with respect to the camera structure. A retainer element 72 is provided which is interconnected with respect to the side positioning elements 66 and 68 and which is adapted to be positioned in at least partially encircling relation with a portion of the camera structure. The retainer element 72 is adapted to provide sufficient retention force so as to retain the photograph receiving receptacle attachment in properly assembled and positioned relationship with respect to the camera structure.

In one case, the camera structure of a commercially available camera defines a projection. Accordingly, the positioning wall structure 70 is formed so as to define an opening 74 which is adapted to receive the projection, thereby further establishing oriented and mechanically interlocked relationship with respect to the camera structure. The bottom wall of the photograph receiving receptacle attachment is formed to define a generally rectangular opening 76 through which the user may visually inspect the image formed on one of the photographic film units positioned within the protective receptacle 64.

In view of the foregoing, it is respectfully submitted that the present invention is clearly capable of achieving each of the objects and features hereinabove set forth together with other objects and features that are inherent in the structure of the apparatus itself. It will be understood that certain combinations and subcombinations are of utility and may be emloyed without reference to other features and subcombinations. This is contemplated by and is within the scope of the present invention.

As many possible embodiments may be made of this invention without departing from the spirit or scope thereof. It is to be understood that all matters hereinabove set forth or shown in the accompanying drawings are to be interpreted as illustrative and not in any limiting sense.

Having thus defined my invention,

I claim:

1. A photograph receiving receptacle attachment for releasable assembly with conventional motorized cameras that transport individual self-developing photographic film units to a presented position subsequent to exposure, said photograph receiving receptacle comprising:

a generally rectangular framework defining a photograph receptacle of sufficient dimension to receive a plurality of self-developing photograph units in stacked manner therein, said framework defining an inlet opening adapted to be positioned in registry with the outlet opening of a camera;

a pair of spaced positioning plate elements being provided on opposed sides of said framework and adapted to receive one end portion of said camera therebetween, a transverse positioning tab extending in angular relation from said framework and adapted to establish surface to surface engagement with a bottom surface portion of said camera, said spaced positioning elements and said transverse positioning element cooperating to stabilize and orient said rectangular framework in outwardly and downwardly inclined relation with respect to said camera so that said film units will descend by gravity into said receptacle; and an elastic retainer band being interconnected with said framework and adapted to extend about a portion of said camera and establish retaining engagement with said camera and releasably secure said framework in assembly with said camera.

2. A photograph receiving receptacle as recited in claim 1, wherein:
said framework defines an extraction opening at the upper portion thereof whereby exposed photographic film units may be removed from said receptacle while said receptacle is in assembly with said camera.

3. A photograph receiving receptacle as recited in claim 1, wherein:
said framework defines a viewing opening through which the image on the first exposed photographic film unit may be inspected while said receptacle is in assembly with said camera.

4. A photograph receiving receptacle as recited in claim 1, wherein:
said framework defines an extraction opening whereby exposed photographic film units may be removed from said receptacle while said receptacle is in assembly with said camera, said extraction opening also being a viewing opening through which the image on the first exposed photographic film unit may be inspected while said receptacle is in assembly with said camera.

5. A photograph receiving receptacle as recited in claim 1, wherein said retainer means comprises:
an elastic band having the extremities thereof interconnected with said positioning plate elements, said retainer band adapted to be positioned about a selected portion of said camera to establish said retaining engagement.

6. A photograph receiving receptacle as recited in claim 1 wherein:
said side positioning members are oriented in angular relation with respect to said generally rectangular framework.

7. A photograph receiving receptacle as recited in claim 1, wherein said framework comprises:
bottom wall means;
side wall means and end wall means being interconnected to said bottom wall means; and
a partial top wall being provided at the lower portion of said rectangular framework and cooperating with said bottom wall means, said side wall means and end wall means to define said photograph receiving receptacle.

* * * * *